(12) United States Patent
Hirabayashi

(10) Patent No.: US 6,805,794 B2
(45) Date of Patent: Oct. 19, 2004

(54) MAGNETIC SEPARATION APPARATUS

(75) Inventor: Yukio Hirabayashi, Tokyo (JP)

(73) Assignee: Kabushiki Kaisha Project Organ, Tokyo (JP)

( * ) Notice: Subject to any disclaimer, the term of this patent is extended or adjusted under 35 U.S.C. 154(b) by 160 days.

(21) Appl. No.: 10/275,688

(22) PCT Filed: May 8, 2001

(86) PCT No.: PCT/JP01/03842

§ 371 (c)(1),
(2), (4) Date: Nov. 8, 2002

(87) PCT Pub. No.: WO01/85347

PCT Pub. Date: Nov. 15, 2001

(65) Prior Publication Data

US 2003/0106849 A1 Jun. 12, 2003

(30) Foreign Application Priority Data

May 9, 2000 (JP) ........................................ 2000-135536

(51) Int. Cl.[7] .............................. B01D 35/06; B03C 1/06
(52) U.S. Cl. ..................................... 210/222; 209/232
(58) Field of Search ............................... 210/222, 695; 209/217, 232

(56) References Cited

U.S. PATENT DOCUMENTS 4,039,447 A   8/1977  Miura et al.
6,139,736 A * 10/2000 Inaba ........................ 210/222

FOREIGN PATENT DOCUMENTS

| GB | 1525071 | 9/1978 |
|----|---------|--------|
| JP | 09-248483 | 9/1997 |
| JP | 10-244424 | 9/1998 |
| WO | WO 97/33696 | 9/1997 |

OTHER PUBLICATIONS

Machine Translation of JP–09–248483, published Sep. 1997.*
Machine Translation of JP–10–244424, published Sep. 1998.*

* cited by examiner

Primary Examiner—David A. Reifsnyder
(74) Attorney, Agent, or Firm—Rabin & Berdo, P.C.

(57) ABSTRACT

A magnetic separation device, with streamlined construction and heightened rate of magnetic adhesion, has two rotating plates 7, 8 which are fixed to a rotation axis and rotate while immersed in a liquid, and magnets 13 mounted on the rotating plates 7, 8. The magnetic separation device is constructed such that magnetic material in the liquid magnetically adheres to the rotating plates 7, 8 and is separated. Further, the magnetic separation device includes a yoke 14, surrounding and accommodating magnets, and having an aperture facing one of the magnetic poles; the yoke 14 has an aperture side face 14c which is in contact with the rotating plates 7, 8; and the aforementioned magnetic pole is in contact with the rotating plates 7, 8. Pairs of magnets 13 are arranged such that opposite magnetic poles oppose each other across the two rotating plates 7, 8, and a magnetic space is formed between the two magnetic plates 7, 8.

5 Claims, 6 Drawing Sheets

MAGNETIC SEPARATION APPARATUS

FIELD OF THE INVENTION

This invention relates to a magnetic separation device which separates material suspended in a liquid using magnetic force.

BACKGROUND OF THE INVENTION

A magnetic separation device is a device which separates material suspended in a liquid using magnetic force. Because there is no need to change filters in a magnetic separation device, separation of suspended material can be performed continuously without interruption. Consequently, maintenance of a magnetic separation device is easy.

The Japanese Patent Application Laid-Open No. Hei9-248483, published by Japan in 1997, and the Japanese Patent Application Laid-Open No. Hei10-244424, published by Japan in 1998, disclose a magnetic separation device, comprising a pair of rotating plates which rotate while submersed in the liquid and a pair of magnets mounted so as to oppose each of the rotating plates, and which separates material suspended in the liquid by magnetic adhesion to the rotating plates.

Japanese Patent Application Laid-Open No. Hei9-248483 discloses a magnetic separation device comprising a yoke 42 formed in a "U" shape, connecting the rear surfaces of two magnets 41 in mutual opposition, as shown in FIG. 7. In this magnetic separation device, when the magnets 41 provided as a pair are within the range over which the magnetic action of one magnet extends to the other magnet, a magnetic circuit is constituted within the yoke 42, and a strong magnetic field occurs between the magnets 41. As a result, the rate of magnetic adhesion of suspended material is increased.

However, in this device, if the magnets 41 provided in a pair are removed to a distance from each other so that the magnetic action from one magnet does not extend to the other magnet, as shown in FIG. 8, a magnetic circuit is not constituted within the "U"-shaped yoke 42. Consequently the magnetic field created between the magnets 41 is weakened, similarly to the case of separate individual magnets, and the rate of magnetic adhesion of suspended material is reduced.

Also, because a plurality of "U"-shaped yokes 42, each provided with a pair of magnets 41, are positioned parallel to the shaft of rotation of a rotating plate, the product cost tends to be increased, and the increased weight of movable parts tends to result in increased running costs.

SUMMARY OF THE INVENTION

Hence an object of this invention is to provide a magnetic separation device with a simple construction and enabling high rates of magnetic adhesion.

In order to attain the above object, this invention provides a magnetic separation device comprising two rotating plates which are fixed to a rotation shaft and rotate while immersed in liquid, and a plurality of magnets mounted on each of the rotating plates, and which causes material suspended in the liquid to magnetically adhere to each of the rotating plates and to be separated from the liquid.

In this magnetic separation device, each of the above magnets is provided with a yoke enclosing the magnet, and having an aperture facing one magnetic pole of the magnet. The yoke comprises an aperture side face, which contacts one of the two rotating plates together with the magnetic pole. A pair of magnets is positioned such that opposite magnetic poles face each other across two rotation plates, so that a magnetic space is formed between the two rotating plates.

More preferably, a "U"-shaped groove is formed in the aperture side face of the above yokes. Still more preferably, the magnetic separation device comprises a scraper which scrapes away magnetic material adhering to the above rotating plates, a mechanism which rotates the above scraper in synchronization with the above rotating plates, and means for guiding such that the above liquid flows in the above magnetic space. It is also preferable that the surfaces of the above rotating plates have the property of repelling the liquid.

By means of this invention, a magnetic circuit is constituted in the yoke enclosing the magnet, so that the magnetic field is concentrated at the magnetic pole surfaces, and in addition a magnetic field, of magnitude substantially equal to that at the magnetic pole surface, can be generated at the aperture side face as well.

The yoke is formed into a cup shape enclosing each of the magnets and is mounted onto each of the rotating plates, so that compared with the above-described conventional magnetic separation device in which a "U"-shaped yoke is positioned spanning two magnets, the amount of use of yokes in the magnetic separation device of this invention is greatly reduced. As a result, the weight of the magnetic separation device can be reduced and product costs can be lowered, and in addition, running costs can be reduced through the reduction in weight of movable parts.

By forming a groove in the aperture side face of the yoke, the magnetic gradient is heightened in the angular portions of the groove, so that large amounts of magnetic material can adhere.

The details and other features and merits of this invention will be made clear in the remainder of the specification, and will be illustrated in the attached drawings.

DESCRIPTION OF THE PREFERRED EMBODIMENTS

Figure 1:
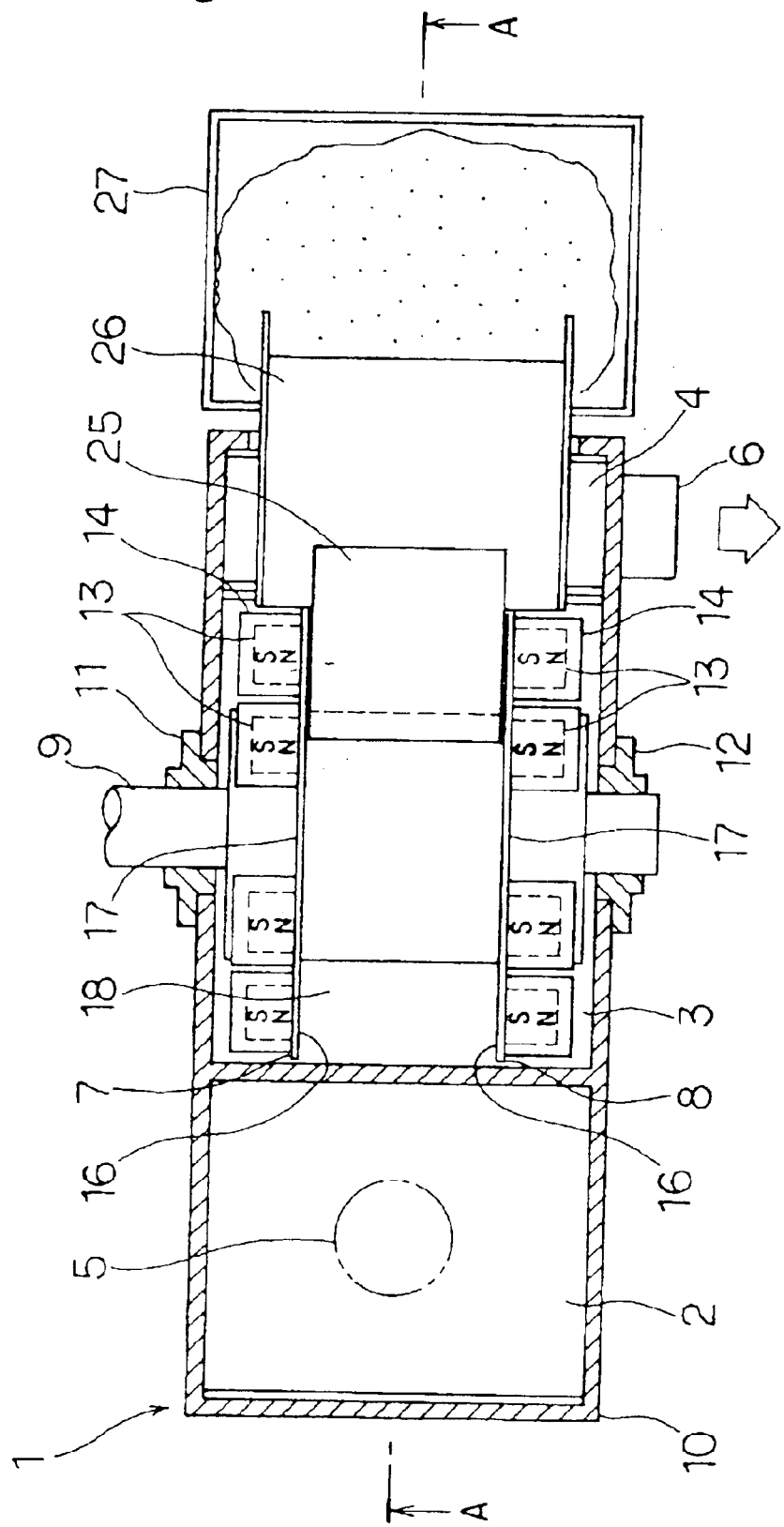
FIG. 1 is a cross-sectional view of a magnetic separation device to which this invention is applied.
Figure 2:
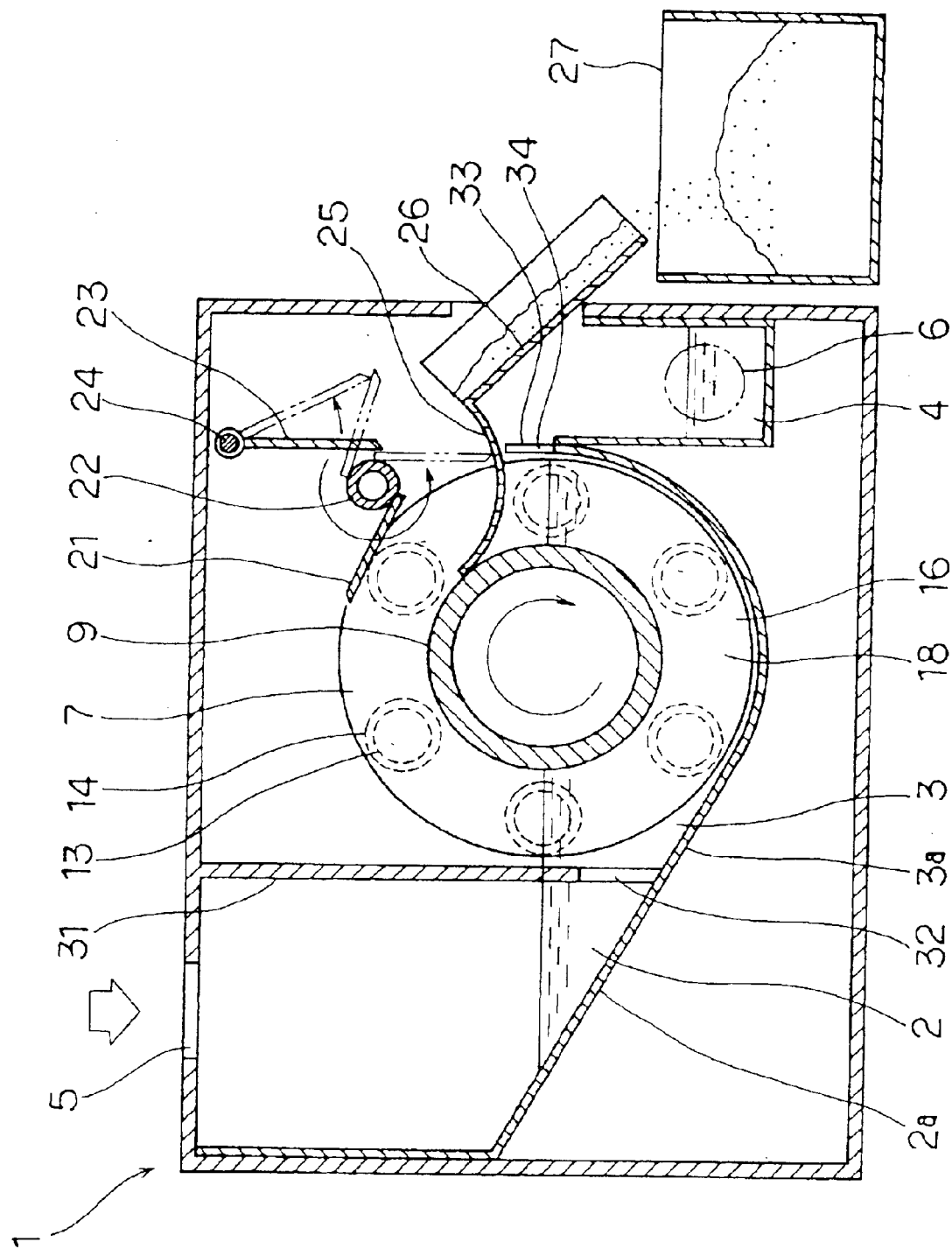
FIG. 2 is a cross-sectional view along line A—A in FIG. 1 of a magnetic separation device to which this invention is applied.

Referring to FIG. 1 and FIG. 2, the magnetic separation device 1 comprises an upstream container 2, solid-liquid separation container 3, and downstream container 4. A liquid containing magnetic suspended material flows into the upstream container 2 from an inlet 5. While this liquid passes from the upstream container 2 to the solid-liquid separation container 3 and flows into the downstream container 4, magnetic suspended material is separated from the liquid. Thereafter, the liquid flows out from an outlet 6 in the downstream container 4. When the inlet 5 and outlet 6 are connected to a machine tool via piping, not shown, the machining liquid of the machine tool is circulated to the magnetic separation device 1.

The upstream container 2 and solid-liquid separation container 3 are formed integrally. From the bottom portion 2a of the upstream container 2 to the bottom portion 3a of the solid-liquid separation container 3, the bottom portion is continuously sloped, and magnetic suspended material in the upstream container 2 is guided toward the solid-liquid separation container 3.

The solid-liquid separation container 3 contains two rotating plates 7, 8 forming a pair. Each of the rotating plates 7, 8, having a disc shape, is fixed to a first rotation shaft 9, and between the rotating plates 7, 8 is formed a magnetic space 18 in which a magnetic field is generated by a plurality of magnets 13. Each of the rotating plates 7, 8 is perpendicular to the direction of the rotation shaft. The rotating plates 7, 8 are formed from a nonmagnetic material, and on the back faces 17 of each are mounted a plurality of permanent magnets 13. In this aspect, the number of permanent magnets is six. The rotating plates 7, 8 rotate while approximately half of each rotating plate is immersed in the liquid collected in the solid-liquid separation container 3. Magnetic material suspended in the liquid adheres to the adhesion surfaces 16 of the rotating plates 7, 8 as a result of the magnetic force of the magnets 13.

As means to have the liquid flow through the magnetic space 18, an aperture portion 32 opposing the magnetic space 18 is formed in the partition wall 31 which separates the upstream container 2 from the solid-liquid separation container 3. An aperture portion 34 opposing the magnetic space 18 is formed in the partition wall 33 which separates the solid-liquid separation container 3 from the downstream container 4. The aperture portions 32, 34 have substantially the same width as the magnetic space 18, and are such that the main flow of the liquid flowing through the solid-liquid separation container 3 passes through the magnetic space 18. Consequently despite the fact that liquid flows around the backs of each of the rotating plates 7, 8 of the solid-liquid separation container 3, the main flow of the liquid passes through the magnetic space 18, and most of the magnetic suspended material adheres to the adhesion surfaces 16.

Figure 3:
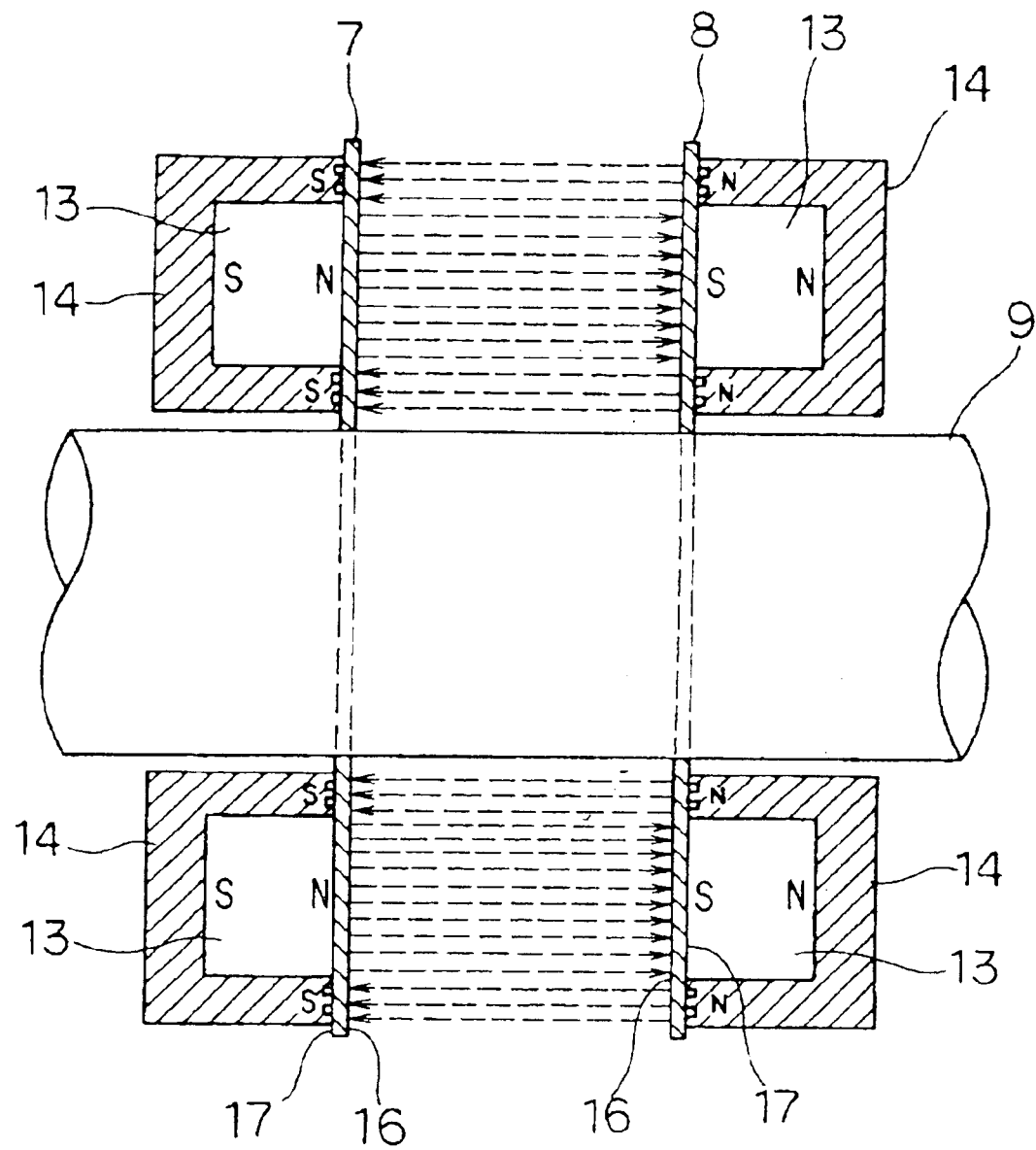
FIG. 3 is a partial cross-sectional view of a magnetic separation device to which this invention is applied.

Referring to FIG. 3, a plurality of magnets 13 are fastened at equal intervals in the circumferential direction to the back surface 17 of each of the rotating plates 7, 8. The magnets 13, provided in pairs and opposing one another across the rotating plates 7 and 8, are positioned with opposing magnetic poles (the N pole and S pole) in opposition. In this aspect, the N poles of the magnets 13 abut the back surface 17 of the rotating plate 7, and the S poles of the magnets 13 abut the back surface 17 of the rotating plate 8. An arrangement in which N poles and S poles of the magnets 13 alternately abut one back surface 17 is also possible.

Figure 4:
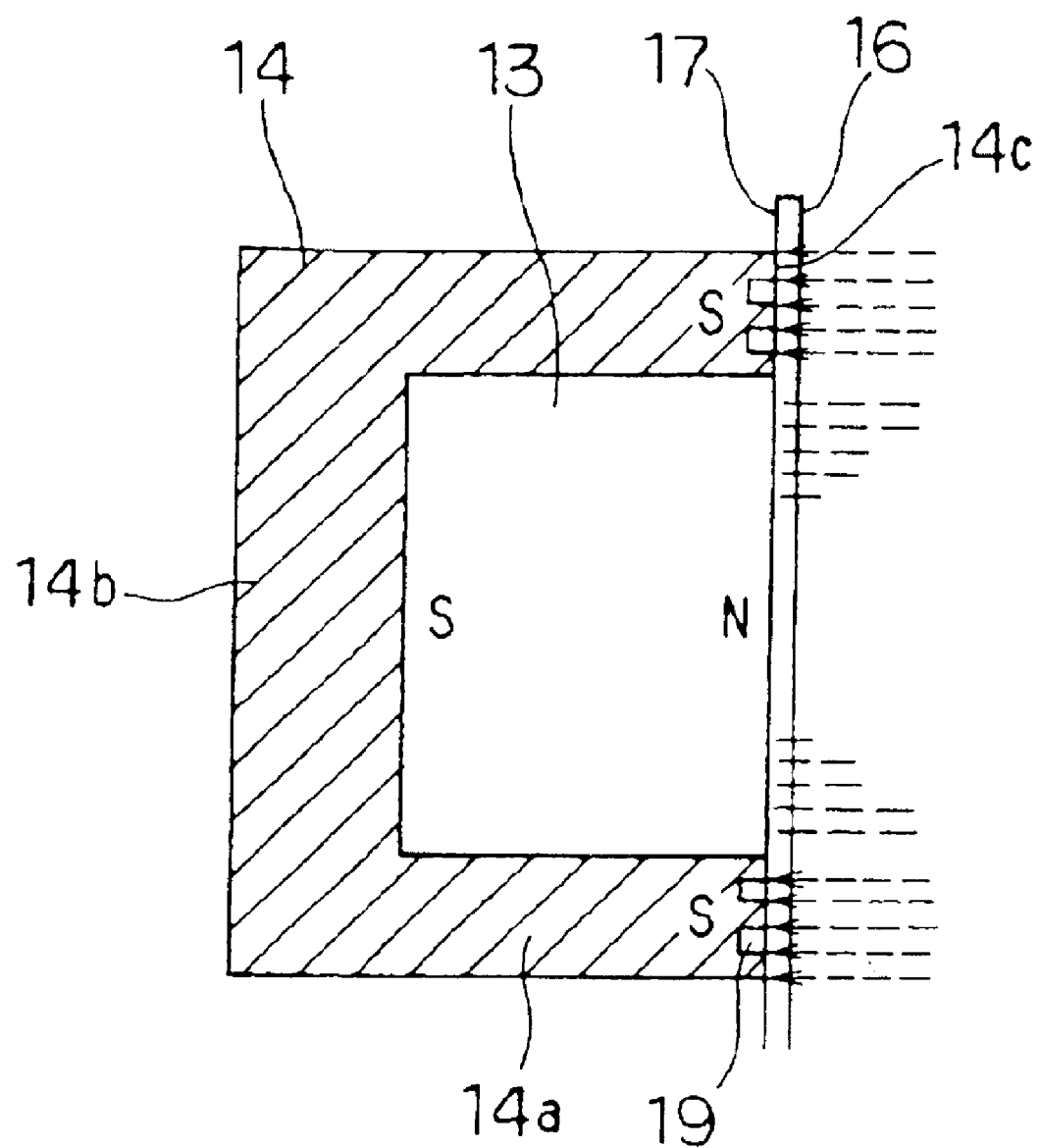
FIG. 4 is an enlarged cross-sectional view of a magnet and yoke of a magnetic separation device to which this invention is applied.

Referring to FIG. 4, the magnets 13 and yokes 14 comprised by the magnetic separation device 1 are explained.

The yoke 14 has a cup-like form (a concave shape), and accommodates a magnet 13. That is, the yoke 14 has an aperture facing one of the magnetic poles of the magnet 13, and surrounds the magnet 13. This yoke 14 comprises a cylindrical side wall portion 14a. The yoke 14 has an end wall portion 14b, which is joined to one end of the side wall portion 14a and abuts one magnetic pole of the magnet 13, and an aperture side face 14c which opposes and surrounds the other magnetic pole of the magnet 13. The magnet 13 is in contact with the inner surface of the yoke 14, without a gap.

The side wall portion 14a and end wall portion 14b have cross-sectional areas in response to the saturation flux density of the magnet 13, to constitute a magnetic circuit. In this aspect, a cylindrical magnet 13 and cylindrical yoke 14 are used; but the cross-sectional shapes of the magnet 13 and yoke 14 need not be circular, and may be polygonal or rectangular.

The yoke 14 is mounted such that the aperture side face 14c and the magnetic pole face of the magnet 13 are in contact with the back surface 17 of one of the rotating plates 7, 8. A strong magnetic field occurs at the sites of contact of the magnetic pole faces of the magnets 13 and aperture side faces 14c on the back surfaces 17 of each of the rotating plates 7, 8, so that the adhesion surfaces 16 can cause adhesion of magnetic suspended material.

The yoke 14 is formed from ferromagnetic material, to constitute a magnetic circuit. In this aspect, magnets having a strong magnetic force, such as for example ferrite magnets, rare-earth magnets or other permanent magnets, are used as the magnets 13; however, electromagnets comprising electromagnetic coils may also be used.

A plurality of grooves 19 with "U"-shaped depressions are formed in ring shapes in the aperture side face 14c of the yoke 14. In this aspect, there are two grooves 19. Because each groove 19 is open on the aperture side face 14c, the yoke 14 has a number of angular portions equal to twice the number of grooves 19, in addition to the angular portions of the inner and outer perimeters of the side wall portion 14a. Hence in this aspect, the magnetic gradient can be raised at a total of six angular portions, so that a large amount of magnetic suspended material can be made to adhere.

The yokes 14 shield the magnetic field behind each of the rotating plates 7, 8, so that magnetic suspended material does not adhere to the yokes 14. Consequently the occurrence of a large resistance to the rotations of the rotating plates 7, 8 can be avoided.

Because the yokes 14 formed from ferromagnetic material surround the magnets 13 to constitute a magnetic circuit providing a path for magnetic force lines, the magnetic field is concentrated at the magnetic pole surfaces. Simultaneously, a magnetic field of substantially the same magnitude as at the magnetic pole surfaces also occurs at the aperture side faces 14c.

Figure 5:
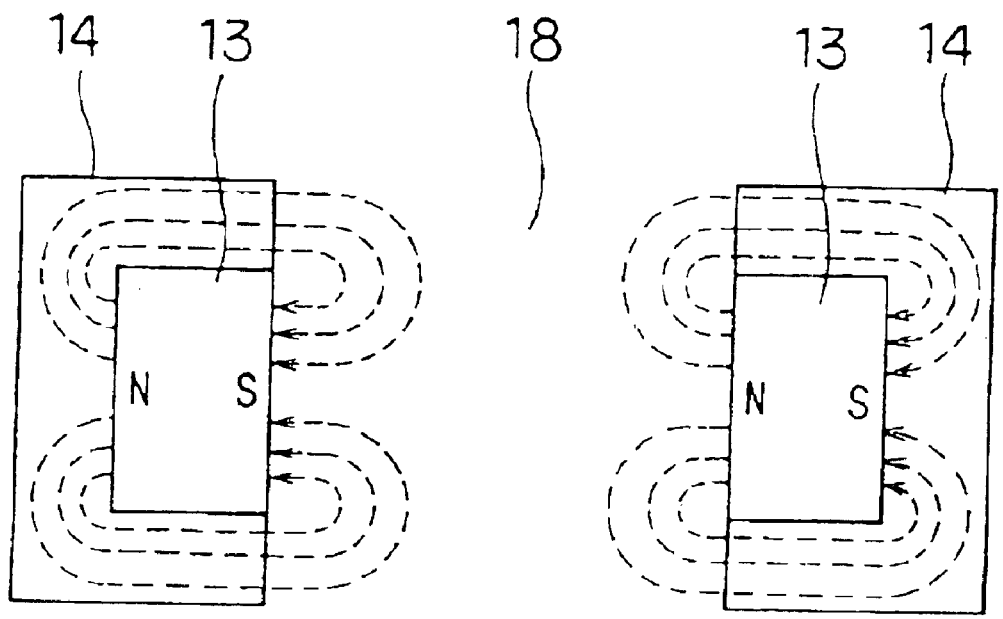
FIG. 5 is a drawing showing the state of distribution of magnetic lines of force created by a magnet and yoke of this invention, when the distance between opposing magnets is large.

As shown in FIG. 5, when two magnets 13 with opposite poles opposing are at a distance such that one magnet does not exert a magnetic action on the other magnet, a magnetic circuit is constituted for each magnet 13 via the yoke 14. In this case, magnetic lines of force connecting the magnetic pole surface and the aperture side face 14c pass through the magnetic space 18, and thus the strength of the magnetic field occurring at the pole faces is substantially twice as great as that of individual magnets 13.

Figure 6:
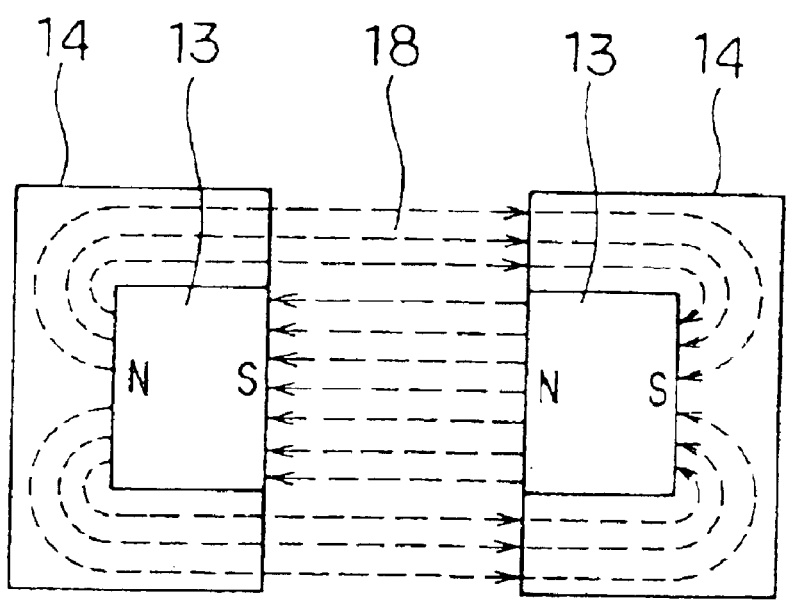
FIG. 6 is a drawing showing the state of distribution of magnetic lines of force created by a magnet and yoke of this invention, when the distance between opposing magnets is small.
Figure 7:
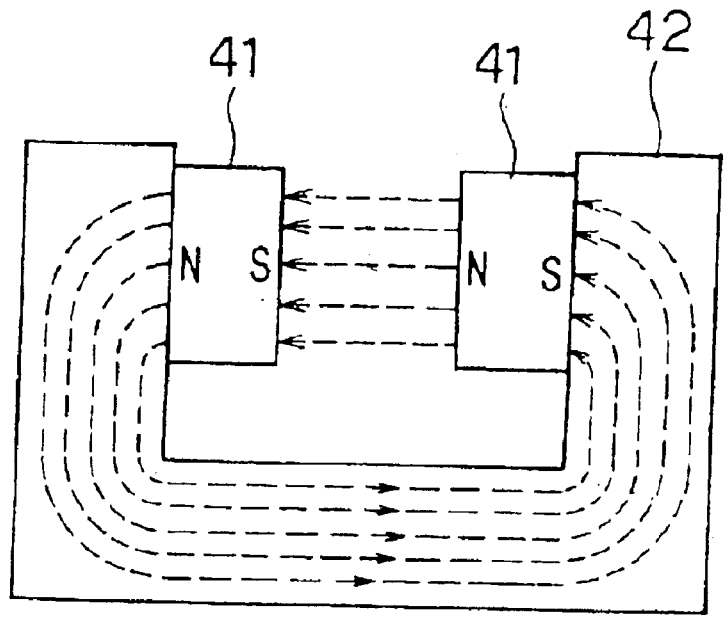
FIG. 7 is a drawing showing the state of distribution of magnetic lines of force created by a magnet and yoke of the prior art, when the distance between opposing magnets is small.
Figure 8:
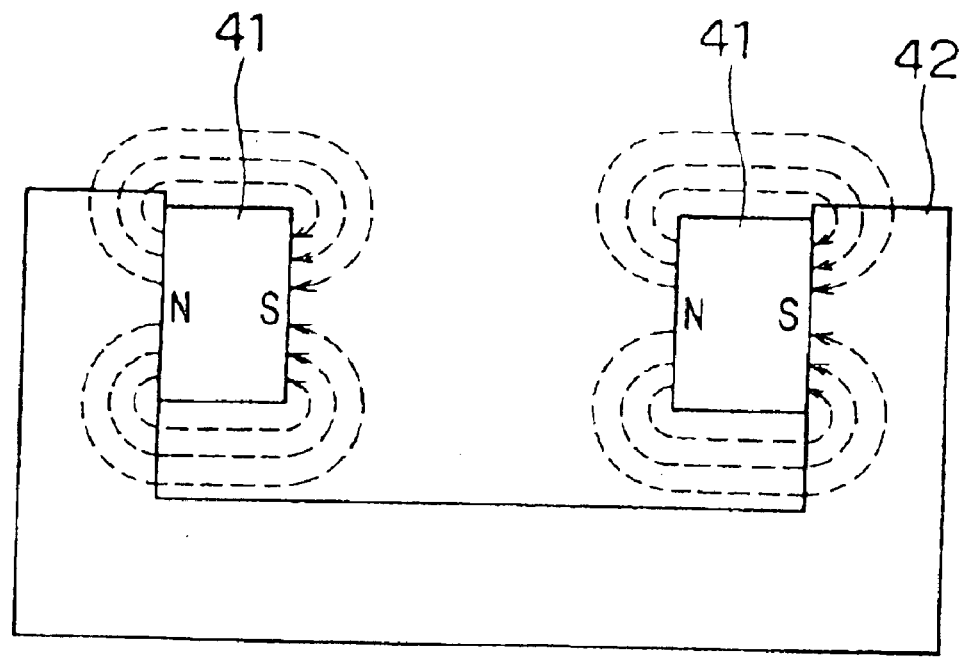
FIG. 8 is a drawing showing the state of distribution of magnetic lines of force created by a magnet and yoke of the prior art, when the distance between opposing magnets is large.

As shown in FIG. 6, when two magnets 13 with opposite poles opposing are at a distance such that one magnet exerts a magnetic action on the other magnet, a magnetic circuit connecting the two magnets 13 via the yoke 14 is constituted. In this case, magnetic lines of force connecting the opposing poles of the magnets 13 cross through the magnetic space 18. Similarly, magnetic lines of force connecting the opposing aperture side faces 14c of the yokes 14 cross through the magnetic space 18, and thus the strength of the magnetic field occurring at pole faces is substantially four times that of the individual magnets 13.

In this way, in the yokes 14 of this invention, the magnetic field occurring at the adhesion surface 16 is strengthened, and the adhesion area of the adhesion surface 16 over which the magnetic field extends is increased, so that magnetic suspended material flowing through the solid-liquid separation container 3 efficiently adheres to the rotating plates 7, 8. Consequently the magnetic separation device 1 of this invention can greatly reduce the amount of magnetic suspended material remaining in the liquid. When applying this invention to grinding equipment, by raising the degree of cleaning of the machining fluid, the machining precision can be improved. And, in such cases reduction of the efficiency of cutting and grinding by bits and grinding elements in the equipment can be prevented, and the lifetimes of the machining fluid and grinding elements can be extended.

By strengthening the magnetic field occurring at the adhesion surface 16, the magnetic suspended material which magnetically adheres to the adhesion surface 16 grows in chainlike fashion, and moves in the liquid together with the rotating plates 7, 8. In this case, carbon and other nonmagnetic suspended material are also drawn out from the liquid together with magnetic suspended material, and are recovered. Consequently when the liquid is the machining fluid of grinding equipment or similar, the anaerobic bacteria in the machining fluid are removed. In addition, magnetic bacteria having magnetic members (magnetite) are also recovered together with suspended material through the action or the strong magnetic field. In this way, a putrid smell of the machining fluid or other liquid due to the occurrence of bacteria can be eliminated.

As shown in FIG. 2, the magnetic separation device 1 comprises a scraper 21 which rotates moving through the magnetic space 18 between the rotating plates 7, 8. This scraper 21 scrapes away magnetic suspended material adhering to both the adhesion surfaces 16 while sliding in contact with the adhesion surfaces 16 of the rotating plates 7, 8. The scraper 21 is formed from rubber material, and the base portion is fixed to a second rotation shaft 22.

This second rotation shaft 22 rotates, in synchronization with the rotating plates 7, 8, in response to the first rotation shaft 9 by means of a rotation transfer device. As shown by arrows in FIG. 2, the rotating plates 7, 8 rotate in the clockwise direction, and the scraper 21 rotates in the counterclockwise direction. During the period in which the rotating plates 7, 8 make one revolution, the scraper 21 rotates, in synchronization with this, a number of times equal to the number of magnets 13 on a rotating plate.

The scraper 21 scrapes magnetic suspended material adhering to each of the adhesion surfaces 16 at the positions of installation of each magnet 13 into the side of the downstream container 4. The scraper 21 rotates in the direction opposite the rotating plates 7, 8 to scrape away suspended material which magnetically adheres to the adhesion surfaces 16. In this way, the scraped-away suspended material is prevented from again adhering to areas to which the magnetic field of the magnets 13 extends. And, by mounting two scrapers 21 in common on the second rotation shaft 22 at an angular separation of 180°, the rate of rotation of the second rotation shaft 22 can be reduced to half.

Above the scraper 21, a scrape-away plate 23 is hung in a rotatable fashion from a shaft 24. By means of gravity, the scrape-away plate 23 scrapes away magnetic suspended material and similar attached to the scraper 21 while making contact with the scraper 21.

Below the scraper 21, a receiver portion 25 which collects the magnetic suspended material which has been scraped away, and a discharge path 26 to discharge the magnetic suspended material collected in the receiver portion 25, are provided. The receiver portion 25 is bent in an arc shape along the path through which the tip of the scraper 21 moves. Magnetic suspended material collected in the receiver portion 25 is transported to the discharge path 26 by the scraper 21. This magnetic suspended material slides and drops into the discharge path 26, and is recovered in a retention container 27 provided outside.

The adhesion surfaces 16 of the rotating plates 7, 8 have the property of repelling water, machining fluid, or other liquids. Consequently liquid, which is attached to the adhesion surfaces 16 and rises above the liquid surface by the rotation of the rotating plates 7, 8, is drawn by the adhesion surfaces 16, and is rapidly returned to the solid-liquid separation container 3. In this way, the carrying of liquid outside the solid-liquid separation container 3 is impeded. In this aspect, each of the rotating plates 7, 8 is formed integrally from a resin having the property of repelling liquids. Each of the rotating plates 7, 8 may also be formed from stainless steel plates not having magnetic properties, and surface treatment then performed to endow the adhesion surfaces 16 with the property of repelling liquids.

The magnetic separation device 1 may also comprise in parallel a plurality of sets of rotating plates 7, 8, each comprising magnets, in order to accommodate increases in flow volume.

This invention is not limited to the above aspect, and various modifications may be made within the scope of the technical concept.

What is claimed is:

1. A magnetic separation device, comprising:

two rotating plates which are fixed to a rotation shaft and rotate while immersed in a liquid; and one or more magnets mounted on each of the rotating plates and causing magnetic adhesion of magnetic material in said liquid to each of said rotating plates to perform separation; each of said magnets comprising a yoke which has an aperture facing one magnetic pole and surrounds said magnet, said one magnetic pole contacting one rotating plate; said yoke comprising an aperture side face in contact with said one rotating plate;

wherein a pair of magnets is positioned such that opposite magnetic poles oppose each other across said two rotating plates to form a magnetic space between said two rotating plates.

2. The magnetic separation device according to claim 1, wherein a "U"-shaped groove is formed in said aperture side face.

3. The magnetic separation device according to claim 1, further comprising a scraper which scrapes away magnetic material attached to said rotating plates, and a mechanism which rotates said scraper in synchronization with said rotating plates.

4. The magnetic separation device according to claim 1, wherein the surfaces of said rotating plates have the property of repelling liquid.

5. The magnetic separation device according to claim 1, further comprising means for guiding said liquid in said magnetic space.

* * * * *